United States Patent

Swiderski, Jr. et al.

[11] 4,147,220
[45] Apr. 3, 1979

[54] CONNECTOR FOR LANYARD WIRE TO CLIP OVER TRIGGER

[75] Inventors: Walter L. Swiderski, Jr., East Haven; John J. O'Brien, Hamden; Stuart D. Kershner, Bethany, all of Conn.

[73] Assignee: Olin Corporation, New Haven, Conn.

[21] Appl. No.: 770,255

[22] Filed: Feb. 18, 1977

[51] Int. Cl.² .............................................. B23B 45/00
[52] U.S. Cl. ........................................ 173/170; 42/1 R; 294/19 R
[58] Field of Search ............... 42/1 R, 1 K, 72; 89/27 R, 27 F, 136; 124/34, 35; 173/170, 171; 294/19-24; 24/253

[56] References Cited

U.S. PATENT DOCUMENTS

| | | | |
|---|---|---|---|
| 413,241 | 10/1889 | Noble | 89/27 F |
| 1,184,078 | 5/1916 | Cooke | 42/72 |
| 1,226,443 | 5/1917 | Baker | 42/1 R |
| 1,740,080 | 12/1929 | Evert | 42/1 K |
| 2,650,400 | 9/1953 | Kellems | 294/20 |
| 3,520,569 | 7/1970 | Anderson | 294/19 A |
| 3,828,458 | 8/1974 | Skone-Palmer | 42/1 R |

FOREIGN PATENT DOCUMENTS

| | | | |
|---|---|---|---|
| 577606 | 6/1958 | Italy | 89/27 R |
| 104790 | 3/1917 | United Kingdom | 42/72 |

*Primary Examiner*—Lawrence J. Staab
*Attorney, Agent, or Firm*—William W. Jones; Paul J. Lerner

[57] ABSTRACT

A connector assembly for use in attaching a lanyard pull wire to the trigger of a powder-actuated tool which is mounted on a pole for overhead use. A tubular member, preferably a spring, receives a wire loop through its bore. The member slips onto the tool trigger, and the lanyard is connected to the wire loop. The connector assembly is thus easily removable and does not require extra tool modification to use.

4 Claims, 5 Drawing Figures

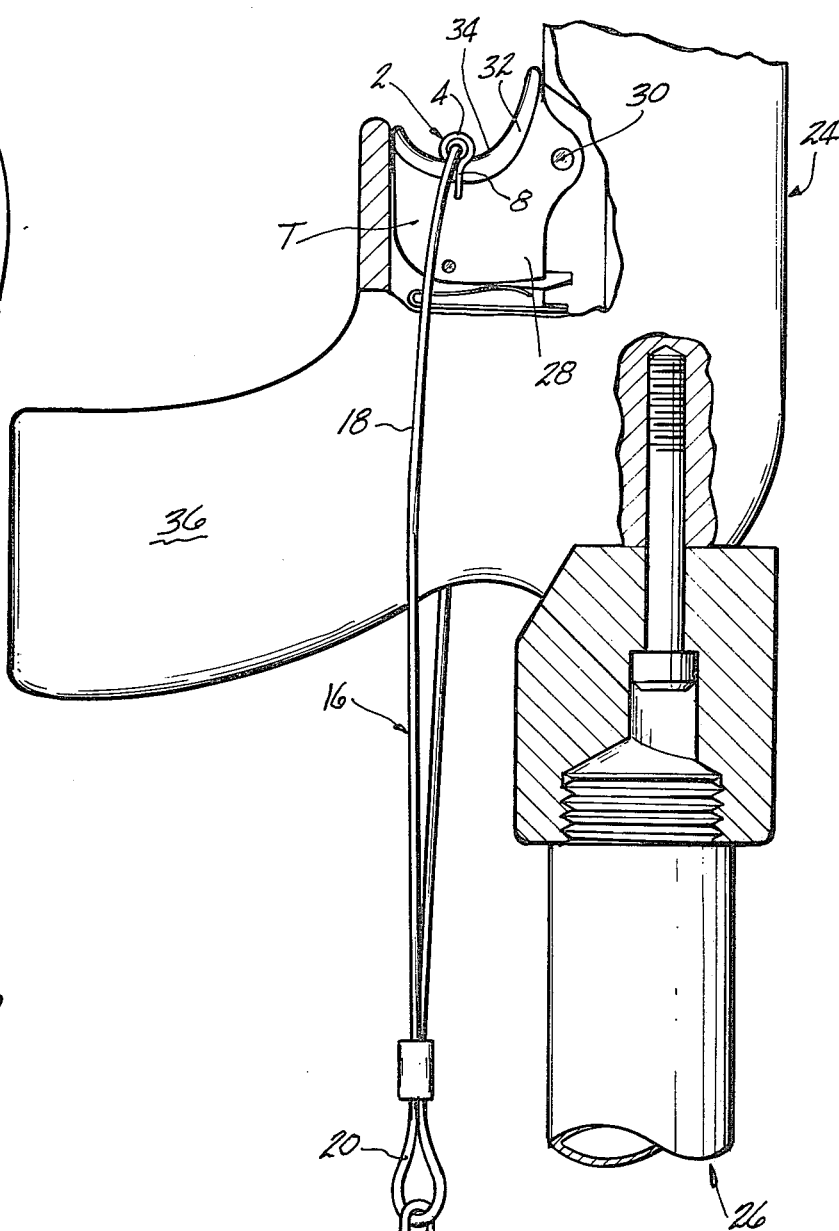
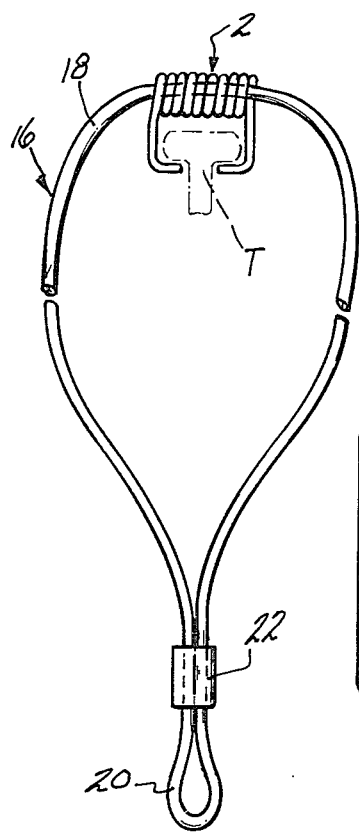
FIG-4
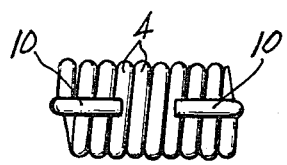
FIG-3
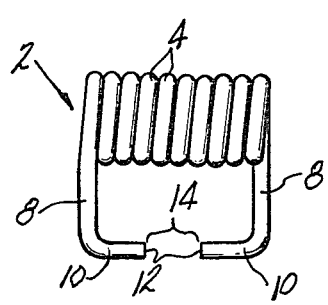
FIG-1
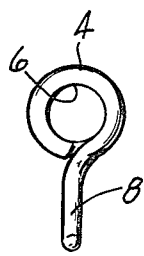
FIG-2
FIG-5

CONNECTOR FOR LANYARD WIRE TO CLIP OVER TRIGGER

This invention relates to a connector assembly which is used to attach a lanyard to the trigger of a powder-actuated tool mounted on a pole for overhead operation.

The mounting of powder-actuated tools on poles to drive fasteners, or the like, into overhead surfaces, such as ceilings, without requiring the use of scaffolding or the like for the tool operator, is generally known in the art. The tool which is mounted on the pole may be impact-actuated, in which case the pole will serve as an impact-transmitting member when struck by a hammer, or the tool may be trigger-actuated, in which case a lanyard or other mechanism must be used by the operator to pull the trigger and fire the overhead tool.

In the case of the prior art pole tools which are trigger-actuated, the attachment of the lanyard to the trigger has been made by drilling a transverse hole through the trigger, passing a connecting wire loop through the hole and draping the loop around the tool handle so that a lanyard could be attached to the loop. This approach is undesirable because it necessitates the use of a special or custom trigger and lanyard assembly.

This invention contemplates the use of a connector assembly for releasable affixation to the trigger of a pole tool, which assembly does not require modification of the tool trigger for use, and which transmits the pulling force to the trigger in substantially the same way as does the human finger.

The connector assembly includes a closely wound spring member, the loops of which define a passage through which passes a wire loop which is connected to the lanyard. The ends of the spring adjacent to the first and last loops extend to form legs parallel to each other in a direction substantially perpendicular to the axis of the passage. Each of the legs of the spring terminates in an inwardly turned tab, the tabs extending at 90° angles to the legs and toward each other, there being a free space between the end faces of the tabs. Thus the spring includes an integral clip portion formed by the legs and tabs which provides means for releasably mounting the spring on the tool trigger. The normal tool trigger includes a broadened force-distributing active face for engagement with the operator's finger, which face is engaged instead by the spring. Pulling the lanyard causes the spring to flex much like a human finger transmitting the pulling force to the trigger in a relatively normal manner.

It is therefore an object of this invention to provide a connector assembly for use in connecting a lanyard to the trigger of a tool which is mounted on a pole for use overhead.

It is a further object of this invention to provide a connector assembly of the character described which may be used with a conventional tool without requiring trigger modification.

It is yet another object of this invention to provide a connector assembly of the character described which will substantially duplicate the force-distributing pulling characteristics of the human finger.

These and other objects and advantages of the invention will become more readily apparent to those skilled in the art from the following detailed description of a preferred embodiment of the invention taken in conjunction with the accompanying drawings, in which:

FIG. 1 is an elevational view of a preferred embodiment of a closely wound spring-type connector formed in accordance with the invention:

FIG. 2 is a side elevational view of the connector of FIG. 1, both sides being similar in appearance;

FIG. 3 is a bottom plan view of the connector of FIG. 1;

FIG. 4 is a plan view of a preferred embodiment of a connector assembly using the connector of FIG. 1 and including a wire loop for connection to the lanyard; and FIG. 5 is a side elevational fragmented view of a trigger operated tool mounted on a pole in the operational position and equipped with the lanyard connector assembly of this invention.

Referring now to the drawings, FIGS. 1–3 show a preferred embodiment of a trigger connector element 2 formed in accordance with this invention. The connector 2 is a closely wound spring having a series of adjacent coils 4 which provide a through passage or bore 6 open at both ends. There are provided lateral side legs 8 which terminate in inwardly turned end parts 10, the end surface 12 of which are spaced apart to form a gap 14 therebetween. It will be appreciated that the connector 2 is much like a wooden clothespin spring in configuration.

Referring to FIG. 4, the connector 2 is shown mounted on a wire loop 16. The loop 16 passes through the connector bore 6 and includes a major portion 18 and a minor portion 20 separated by a collar 22. The connector 2 is strung onto the major portion 18. Shown in phantom is a tool trigger T indicating how the connector will attach to the trigger.

Referring to FIG. 5, the connector assembly of FIG. 4 is shown mounted on a tool 24, which in turn is mounted on a pole 26, the entire device being shown in FIG. 5 as it appears when held aloft by an operator by means of the pole 26 so that the tool can be used on an overhead surface. The tool trigger T has a conventional web portion 28 through which a pin 30 passes to pivotally connect the trigger T to the rest of the tool 24. A conventional firing system (not shown) is actuated by pulling the trigger to fire the tool. The trigger T also includes a laterally enlarged flange 32 with a curved active surface 34 which would normally be engaged by the operator's finger, were the tool not mounted on the pole 26. The flange 32 and broad surface 34 are conventional trigger features used to impart comfortable trigger pull features to the tool. The connector 2 is releasably mounted on the trigger T by being clipped over the trigger flange 32 so that the coils 4 overlie the trigger surface 34, the legs 8 are adjacent to the sides of the flange 32, and the inwardly turned and parts 10 (see FIG. 1) underlie the flange 32. The major portion 18 of the wire loop 16 is draped around the butt of the tool with the tool handle 36 extending therethrough. The minor portion 20 of the wire loop 16 is connected to a lanyard L which is pulled by the operator to fire the tool.

It will be appreciated that the tubular configuration of the connector provides a desirable guide for the wire and also distributes pull forces over the trigger much like an operator's finger. The clipping legs and inwardly turned ends provide means whereby the connector can be connected to and disconnected from the trigger easily by manual manipulation, however, at the same time, the connector will not accidently slip off of the trigger easily. The longitudinal flexibility of the spring-type connector preferred for use also helps distribute pull force properly over the trigger. Use of the connector does not require any tool or trigger modification and therefore is preferable to the prior art drilled trigger.

Since many changes and variations of the disclosed embodiment of the invention may be made without departing from the inventive concept, it is not intended to limit the invention otherwise than as required by the appended claims.

What is claimed is:

1. A trigger actuating assembly for use with a powder-actuated tool having a trigger, which tool is mounted on a pole for use overhead, said assembly comprising: a tubular member adapted to be positioned in contact with the finger-contacting surface of the trigger, said member including means for releasably attaching said member to the trigger; and a pull wire member extending through said tubular member, said pull wire member forming a loop which can be loosely draped around the butt end of the tool.

2. A trigger actuating assembly for use with a powder-actuated tool having a trigger, which tool is mounted on a pole for use overhead, said assembly comprising: a tubular member adapted to be positioned in contact with the finger-contacting surface of the trigger, said member including means for releasably attaching said member to the trigger; and a pull wire member extending through said tubular member, said tubular member forming a loop which can be loosely draped around the butt end of the tool, said tubular member comprising a closely wound spring.

3. In combination with a powder-actuated tool having a trigger; a pole secured to the butt end of the tool to adapt the tool for use overhead; a tubular connector mounted on said tool trigger overlying the surface on the trigger normally engaged by an operator's finger in firing the tool; a pull wire extending through the bore of said connector, said pull wire forming a loop which is draped around said tool butt end; and means for actuating said pull wire to fire the tool.

4. The device of claim 3, wherein said connector is a closely wound spring.